(12) United States Patent
Domine et al.

(10) Patent No.: US 7,335,424 B2
(45) Date of Patent: Feb. 26, 2008

(54) IONOMER LAMINATES AND ARTICLES FORMED FROM IONOMER LAMINATES

(75) Inventors: Joseph D. Domine, Humble, TX (US); Jeffrey Valentage, Royal Oak, MI (US); Prasadarao Meka, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 176 days.

(21) Appl. No.: 11/141,306

(22) Filed: May 31, 2005

(65) Prior Publication Data

US 2005/0221077 A1 Oct. 6, 2005

Related U.S. Application Data

(63) Continuation of application No. 10/469,072, filed as application No. PCT/US02/08963 on Mar. 21, 2002, now abandoned.

(60) Provisional application No. 60/279,911, filed on Mar. 29, 2001.

(51) Int. Cl.
*B32B 27/08* (2006.01)

(52) U.S. Cl. ............... 428/516; 428/520; 428/522; 264/173.11; 264/173.14; 264/173.15

(58) Field of Classification Search ........... 428/516, 428/520, 522; 264/173.11, 173.14, 173.15
See application file for complete search history.

(56) References Cited

U.S. PATENT DOCUMENTS

| | | | |
|---|---|---|---|
| 2,714,605 A | 8/1955 | Jones et al. ............ 260/458 |
| 2,764,563 A | 9/1956 | McMaster et al. ........ 260/2.2 |
| 3,072,618 A | 1/1963 | Turbak ................ 260/79.3 |
| 3,094,144 A | 6/1963 | Oxley et al. ........... 137/609 |
| 3,097,194 A | 7/1963 | Leonard et al. ........ 260/88.2 |
| 3,205,285 A | 9/1965 | Turbak et al. ......... 260/89.7 |
| 3,255,130 A | 6/1966 | Keim et al. |
| 3,264,272 A | 8/1966 | Rees ................. 260/78.5 |
| 3,322,734 A | 5/1967 | Rees ................. 260/79.3 |
| 3,338,734 A | 8/1967 | Goff et al. ............ 117/64 |
| 3,355,319 A | 11/1967 | Rees ................. 117/122 |
| 3,522,222 A | 7/1970 | Taylor ............... 260/80.78 |
| 3,522,223 A | 7/1970 | Taylor ............... 260/80.78 |
| 3,791,915 A | 2/1974 | Goehring et al. ........ 161/227 |
| 4,136,226 A | 1/1979 | Gilman ................ 428/315 |
| 4,148,972 A | 4/1979 | Yamane et al. ......... 428/515 |
| 4,335,175 A | 6/1982 | Webb ................. 428/213 |
| 4,656,098 A | 4/1987 | Yonekura et al. ........ 428/517 |
| 4,716,085 A | 12/1987 | Biale ................. 428/476.9 |
| 4,800,130 A | 1/1989 | Yonekura et al. ........ 428/517 |
| 4,999,227 A | 3/1991 | Vander Togt ........... 428/31 |
| 5,196,246 A | 3/1993 | Kauss et al. ........... 428/39 |
| 5,206,294 A | 4/1993 | Dawson ............... 525/196 |
| 5,342,666 A | 8/1994 | Ellison et al. ........... 428/46 |
| 5,482,766 A | 1/1996 | Mathavan et al. ....... 428/308.4 |
| 5,482,771 A | 1/1996 | Shah ................. 428/349 |
| 5,504,156 A | 4/1996 | Takezaki et al. ........ 525/93 |
| 5,543,233 A | 8/1996 | Latiolais et al. ........ 428/516 |
| 5,554,698 A | 9/1996 | Wang et al. ........... 525/330.2 |
| 5,599,877 A | 2/1997 | Wang et al. ........... 525/146 |
| 5,631,328 A | 5/1997 | Wang et al. ........... 525/329.7 |
| 5,643,999 A | 7/1997 | Lee et al. ............. 525/193 |
| 5,718,947 A | 2/1998 | Martin et al. ........... 427/243 |
| 5,725,712 A | 3/1998 | Spain et al. ............ 156/230 |
| 5,728,476 A | 3/1998 | Harwood et al. ........ 428/500 |
| 5,763,062 A | 6/1998 | Smith et al. ........... 428/215 |
| 5,866,658 A | 2/1999 | Talkowski ............ 525/183 |
| 5,888,714 A | 3/1999 | Bourdelais et al. ....... 430/536 |
| 5,906,850 A | 5/1999 | Gasse et al. ........... 426/412 |
| 6,106,415 A | 8/2000 | Masutani et al. ........ 473/374 |
| 6,193,616 B1 | 2/2001 | Sullivan et al. ......... 473/351 |
| 6,403,005 B1 | 6/2002 | Mientus et al. ......... 264/173.1 |
| 2002/0009594 A1 | 1/2002 | Smith et al. ........... 428/411.1 |
| 2002/0055006 A1* | 5/2002 | Vogel et al. ........... 428/520 |
| 2002/0114951 A1 | 8/2002 | Horansky ............. 428/412 |
| 2002/0114965 A1 | 8/2002 | Horansky ............. 428/520 |

FOREIGN PATENT DOCUMENTS

| | | |
|---|---|---|
| DE | 36 26 809 | 12/1987 |
| DE | 4222832 | 1/1994 |
| DE | 197 31 051 | 1/1999 |
| EP | 0 342 244 | 11/1989 |
| EP | 0 343 877 | 11/1989 |
| EP | 0 721 856 A2 | 7/1996 |
| EP | 0 721 856 B1 | 7/1996 |
| EP | 0 630 746 | 7/1997 |
| EP | 0 950 511 | 10/1999 |
| EP | 0 635 360 | 12/1999 |
| EP | 0 980 752 | 2/2000 |
| EP | 1 038 788 | 9/2000 |
| EP | 1 041 110 | 10/2000 |
| EP | 0 642 921 | 12/2001 |
| EP | 0 837 078 | 8/2002 |
| GB | 1011981 | 12/1965 |
| JP | 04 052136 | 2/1992 |
| JP | 08 269409 | 11/1996 |
| JP | 3-24954 | 2/1999 |
| JP | 2000 016190 | 1/2000 |
| JP | 2000-85062 | 3/2000 |
| WO | WO 95/04655 | 2/1995 |
| WO | WO 95/11929 | 5/1995 |

(Continued)

OTHER PUBLICATIONS

Abstract—Patent No. DE 197 31 051 (publ. Jan. 28, 1999).

(Continued)

*Primary Examiner*—Leszek Kiliman

(57) ABSTRACT

A co-extruded laminate of at least one layer of an ionomer and at least one layer of an acid polymer that can be thermoformed with a plastic substrate such as a polyolefin. The laminate can be pigmented to eliminate the need to paint the surface of the plastic substrate. Articles can be formed from the laminated substrate such as automotive parts and sporting equipment.

76 Claims, 3 Drawing Sheets

FOREIGN PATENT DOCUMENTS

| | | |
|---|---|---|
| WO | WO 95/19392 | 7/1995 |
| WO | WO 96/23009 | 8/1996 |
| WO | WO 96/30455 | 10/1996 |
| WO | WO 98/55296 | 12/1996 |
| WO | WO 97/02317 | 1/1997 |
| WO | WO 97/09358 | 3/1997 |
| WO | WO 97/09380 | 3/1997 |
| WO | WO 97/11995 | 4/1997 |
| WO | WO 97/27894 | 8/1997 |
| WO | WO 97/31976 | 9/1997 |
| WO | WO 97/35910 | 10/1997 |
| WO | WO 97/46381 | 12/1997 |
| WO | WO 97/46384 | 12/1997 |
| WO | WO 98/01291 | 1/1998 |
| WO | WO 98/02305 | 1/1998 |
| WO | WO 98/08902 | 3/1998 |
| WO | WO 98/24324 | 6/1998 |
| WO | WO 98/31549 | 7/1998 |
| WO | WO 98/32598 | 7/1998 |
| WO | WO 98/36003 | 8/1998 |
| WO | WO 98/03565 | 11/1998 |
| WO | WO 98/52981 | 11/1998 |
| WO | WO 99/07229 | 2/1999 |
| WO | WO 99/28791 | 6/1999 |
| WO | WO 99/51669 | 10/1999 |
| WO | WO 00/02724 | 2/2000 |
| WO | WO 00/07815 | 2/2000 |
| WO | WO 00/73148 | 12/2000 |
| WO | WO 01/74587 | 10/2001 |
| WO | WO 01/78981 | 10/2001 |
| WO | WO 02/28957 | 4/2002 |

OTHER PUBLICATIONS

Abstract—Patent No. EP 0 630 746 (publ. Jul. 23, 1997).
Abstract—Patent No. EP 0 635 360 (publ. Dec. 1, 1999).
Translation—Patent No. EP 0 721 856 B1 (publ. Jul. 17, 1996).
Translation—JP Application P2001-200069—filed Jan. 18, 2000.
Abstract—Patent No. JP 1901706, filed Jun. 30, 1986.
Abstract—Patent No. JP 49-129776, filed Dec. 12, 1974.
Abstract—Patent No. JP 56-146758, filed Nov. 14, 1981.
U.S. Appl. No. 10/472,871, filed Sep. 23, 2003, entitled "*Ionomer Laminates and Articles Formed From Ionomer Laminates*", Domine et al.
Abstract, WO 00/02724 (published Feb. 20, 2000).
Abstract, WO 00/07815 (published Feb. 17, 2000).
Abstract for JP 2000 016190, published Jan. 18, 2000 (see line AJ).
Translation for DE 4222832, published Jan. 13, 1994 (see line AK).
U.S. Appl. No. Not Yet Assigned, filed May 31, 2005, entitled "Ionomer Laminates and Articles Formed From Ionomer Laminates", Domine et al.

* cited by examiner

Figure 1. An embodiment of the laminate
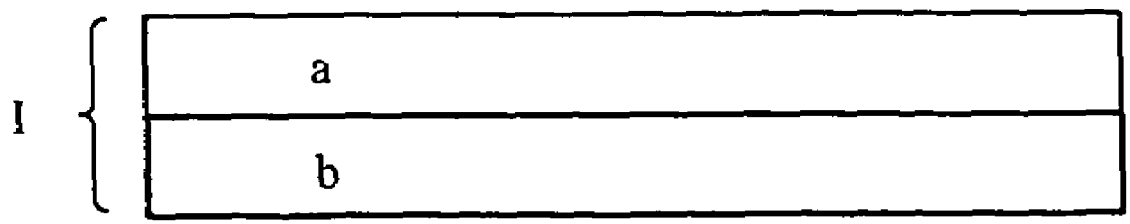

Figure 2. An embodiment of the composite
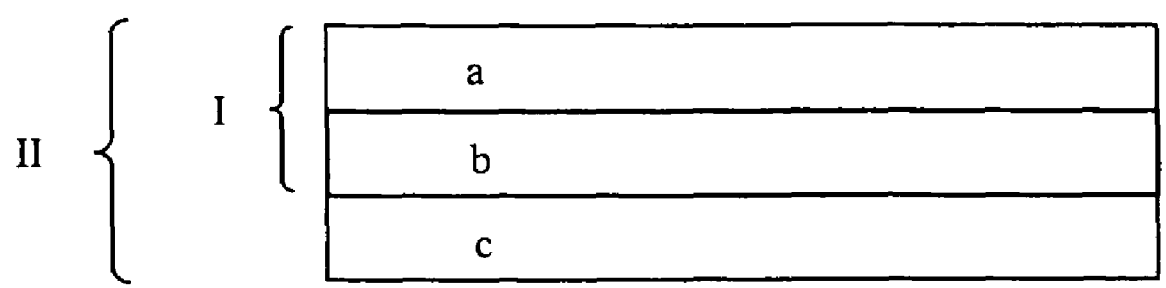

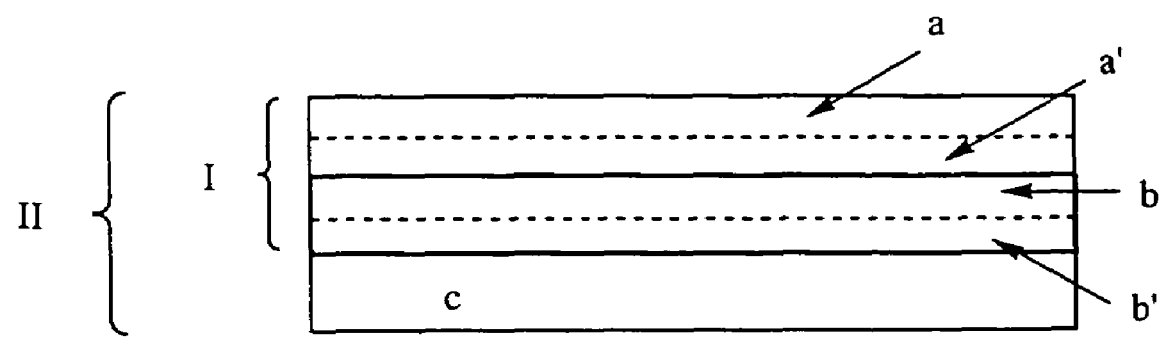
Figure 3. Another embodiment of the composite

IONOMER LAMINATES AND ARTICLES FORMED FROM IONOMER LAMINATES

CROSS REFERENCE TO RELATED APPLICATIONS

This application is a continuation of Ser. No. 10/469,072, filed Aug. 25, 2003, now abandoned which is a National Stage Application of International Application No. PCT/US02/08963, filed Mar. 21, 2002, which claims the benefit of Provisional Application No. 60/279,911, filed Mar. 29, 2001.

FIELD OF THE INVENTION

The present invention relates to composites formed from ionomer and acid polymer laminates contacted with a substrate material such as a polyolefin, and methods of making the articles from shaped ionomer/acid polymer laminates.

BACKGROUND OF THE INVENTION

Durable, glossy fascia associated with articles such as automobiles, luggage, and other durable articles made from plastics increase both the aesthetic appeal and the utility of these articles. However, due to the physical characteristics of many plastics such as polyethylene, polypropylene, polystyrene, etc., it is often difficult if not impossible to color these external surfaces with traditional paints and by common painting techniques. Moreover, the paints themselves present an environmental problem, and reduce the recyclability of the articles once painted. Thus, there is considerable interest in developing new methods of creating protective and decorative fascia for use on such articles.

Ionomer materials are known in the art, and are known to be useful in plastic films and for coating to various plastic substrates. See, for example, U.S. Pat. Nos. 5,482,766, 4,148,972, 5,543,233, 4,800,130, 4,656,098, 5,206,294, 4,335,175; DE 36 26 809 A; EP 0 721 856; and JP 08269409, 2000085062, and 04052136. Ionomer coatings are useful for their scratch and abrasion resistance, as well as toughness and aesthetic appeal. A continued problem in the use of ionomers is bonding the ionomer sheet or layer to a substrate layer. This is particularly true where the substrate is pre-formed and the ionomer must then be secured onto the substrate, which is most often the case in current processes. For example, when the substrate is an automobile bumper made from such materials as polypropylene or ethylene-propylene copolymer, the substrate material is typically injection molded to form the solid bumper in a first step. In order to then color this bumper, it must either be painted with traditional automotive paints, or some material must otherwise be secured onto the bumper after it is formed, making it impractical to secure multi-layered materials such as, for example, laminated ionomer or ionomer layers, onto the bumper.

What is needed is a method of attaching a pre-pigmented material such as an ionomer to a substrate, wherein the ionomer comprises one or more layers that is pre-formed to the shape of the desired end use article that allows the substrate to then be secured to the shaped ionomer material.

SUMMARY OF THE INVENTION

These and other problems are solved by the present invention, wherein a laminate is formed that can be shaped and secured to a substrate, thus forming a composite article. The laminate includes at least one layer of an ionomer, and a tie-layer that allows the laminate to be secured to the substrate. The tie-layer may have at least one layer of an acid polymer, or blend of acid polymer and another material. The laminate, composite, and process of forming the laminate and composition as disclosed herein eliminates the need for painting and create a highly recyclable article. The laminates of the invention are amenable to various processes known in the art such as co-extrusion, thermoforming and injection molding, and thus versatile.

One embodiment of the invention is a shaped laminate comprising at least one layer of ionomer, a tie-layer having at least one layer of an acid polymer, wherein the first layer and tie-layer contact one another to form a shaped laminate. In another embodiment, the shaped laminate may be further secured to a substrate to form the shaped composite. At least one of the ionomer layers is pigmented in a desirable embodiment.

The at least one tie-layer may be a blend of acid polymer and a polyolefin, a soft-ionomer, a soft-ionomer and acid polymer blend, a soft-ionomer and polyolefin blend, or any combination thereof. Further, the tie-layer may have any number of layers of these various materials. The polyolefin may include, for example, polyethylene polymers, polyethylene copolymers, polypropylene polymers, polypropylene copolymers, polypropylene impact copolymer and a blend of polypropylene impact copolymer and ethylene plastomer, and mixtures thereof. A desirable embodiment of the tie-layer is single or double layer of a blend of polypropylene or polyethylene with an acid terpolymer.

The substrate may be a polyolefin or other thermoplastic such as, for example, polyethylene polymers, polyethylene copolymers, polypropylene polymers, polypropylene copolymers, polypropylene impact copolymer and a blend of polypropylene impact copolymer and ethylene plastomer, wood, fiberglass, metal, and mixtures thereof.

Also, the invention includes a method of forming a shaped laminate and composite comprising thermoforming a laminate into the shape, the laminate having at least one layer of ionomer and a tie-layer having at least one layer of an acid polymer, wherein the first layer and tie-layer contact one another to form the laminate. Another embodiment includes the step of securing such as by, for example, injection molding or painting a substrate layer to the tie-layer of the laminate to form the shaped composite. The laminate can be made by co-extrusion processes known in the art.

BRIEF DESCRIPTION OF THE DRAWINGS

FIG. 1 is a representation of one embodiment of the laminate of the invention;

FIG. 2 is a representation of one embodiment of the composite of the invention; and FIG. 3 is a representation of yet another embodiment of the composite of the invention.

DETAILED DESCRIPTION OF THE INVENTION

As used herein, the term "laminate" is used to refer to any number of the same or different materials in film, sheet or layer form, each layer being secured to one another by any appropriate means such as by an inherent tendency of the materials to adhere to one another, or by inducing the materials to adhere as by a heating, radiative, process, or some other appropriate process. Some non-limiting process examples of forming laminates are co-extrusion, thermal lamination, or adhesive bonding, or some combination thereof.

As used herein, the term "layer" is used to refer to each of the one or more materials, the same or different, that are secured to one another by any appropriate means such as by an inherent tendency of the materials to adhere to one another, or by inducing the materials to adhere as by a heating, radiative, chemical, or some other appropriate process. The term "layer" is not limited to detectable, discrete materials contacting one another in a finished product such that a distinct boundary exists between the materials. The term "layer" includes a finished product having a continuum of materials throughout its thickness.

As used herein, in reference to "Groups", the new numbering scheme for the Periodic Table Groups are used as in HAWLEY'S CONDENSED CHEMICAL DICTIONARY 852 (13th ed. 1997).

Embodiments of the present invention include a tie-layer having at least one acid polymer or blend of acid polymer and other materials described further below, and its incorporation into a laminate with at least one layer of an ionomer material. The laminate is formed into a shape—such as by thermoforming in one embodiment—that is consistent with a desirable end use article to be manufactured. The shaped laminate is then combined with a plastic substrate material such as a polyolefin to form a composite (hereinafter "composite") or composite article (or "shaped composite") such as by an injection molding process in one embodiment. The laminate layers may be formed by any conventional method known to those skilled in the art. One embodiment of the laminate and composite can be described as shown in FIG. 1. In the embodiment in FIG. 1, I represents the laminate having at least one ionomer layer a and a tie-layer b. It is understood that the layers a and b are not meant to be limited to only one layer, but each can be a multiple of layers or blend of materials.

An embodiment of the composite of the invention is shown in FIG. 2, wherein I represents the laminate having at least one ionomer layer a and a tie-layer b and II represents the composite comprising the laminate I and at least one substrate layer c. It is understood that the layers a, b, and c are not meant to be limited to only one layer, but each can be a multiple of layers or blends of materials.

As an illustration of another embodiment of the composite of the invention, a laminate and composite are shown in FIG. 3, wherein the laminate I has at least two layers of ionomer a and a', and the tie-layer has at least two layers of materials b and b', the laminate being coupled to the substrate layer c, shown as a single layer in this embodiment.

The tie-layer and substrate are contacted with one another to form an area of adhesion between the two layers. In one embodiment, the area of adhesion is uniform and continuous. Also, in another embodiment, the final shaped composite article will be such that at least part of the at least one ionomer layer will be exposed to the external environment and be visible, while in another embodiment part or all of the ionomer layer may not be exposed to the environment or be seen. Below is a more detailed description of each component of the laminate: the ionomer and at least one tie-layer that make up I, and the substrate(s) layer that, together with the ionomer and acid polymers, make up the composite II.

Ionomer

Ionomers used in the present invention are ionic compounds which are copolymers of $C_2$ to $C_4$ α-olefin derived units (ethylene is herein included as an "α-olefin"), and $C_3$ to $C_6$ α,β-ethylenically unsaturated carboxylic acids, and which contain one or more kinds of metallic ions associated with the acidic pendant groups of the polymer. Typical ionomers and methods of production are disclosed in, for example, WO 98/52981, WO 95/11929. WO 96/23009, WO 97/11995, and WO 97/02317.

The uncomplexed metal ions suitable for forming the ionic copolymers of the present invention comprise mono, di or tri-valent metal ions in the Groups 1 through 13 of the Periodic Table of Elements. Embodiments include the following metal ions: $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$ $Sc^{3+}$, $Fe^{3+}$, $Al^{3+}$ and $Yt^{3+}$. In the various ions mentioned above, $Mg^{2+}$, $Na^+$ and $Zn^{2+}$ are metals used in desirable embodiments. Reaction of the carboxylic acid groups of the ionomer and a metal ion derived from a desirable metal compound (metal oxide, metal chloride, etc.) is referred to as "neutralization".

The ionomers used in this invention generally include more than 50 wt % in one embodiment, and from 75 to 95 wt % in another embodiment, of α-olefin derived units and from 5 to 25 wt % of α,β-ethylenically unsaturated carboxylic acid derived units.

One embodiment of an ionomer can be described as below in the following structure (1):

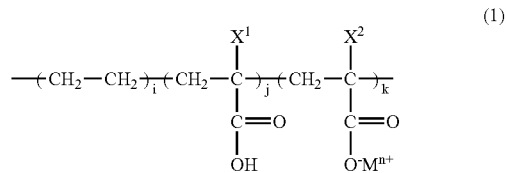

(1)

wherein $X_1$ and $X_2$ can be the same or different and are hydrogen or a $C_1$ to $C_6$ alkyl, and $Mn^+$ is a metal ion or $NH_4^+$. Of course, it is understood that when n is 2-4, such as with a divalent metal ion such as $Zn^{2+}$, that charge neutrality for the ionomer is achieved by reaction with a total of n acid groups from either the same polymer chain, or an adjacent polymer chain. The diagram (1) is not intended to be construed that the ionomer is a block copolymer or limited to being a block copolymer. The values of i, j, and k are determined by the following relationships (2) and (3):

$$\frac{j+k}{i+j+k} = Q \qquad (2)$$

$$\frac{k}{j+k} = P \qquad (3)$$

wherein Q is from 10 to 40% of the polymer units derived from the acidic monomer(s) relative to the total weight of the ionomer in one embodiment, and from 15 to 20% of polymer units derived from the acidic monomer(s) in another embodiment, and P is from 10 to 50% of the acidic groups neutralized with the metallic ions in one embodiment, and from 20 to 40% of the acidic groups neutralized with the metallic ions in another embodiment. The polymer component i, derived from ethylene in one embodiment, can be linear or branched.

Ideal ionomers should be capable of being formed into a sheet or skin, have a high scratch resistance, a high gloss, and a high abrasion resistance. Embodiments of the ionomer have a melt temperature of between 80° C. and 88° C., and a melt index (MI) of between 0.5 and 3 dg/min (ASTM D1238, 190/2.16) in one embodiment, and from 0.8 to 2.5 dg/min in another embodiment. The ionomers have a 1% secant flexural modulus (ASTM D-790) of between 150 and 400 MPa in one embodiment, and from 200 to 350 MPa in another embodiment. Desirable ionomers are ethylene acrylic acid copolymer ionomers and the like.

Other examples of ionomers include, but are not limited to, butadiene-acrylic acid copolymer ionomers, perfluorsulfonate ionomers, perfluorocarboxylate ionomers, telechelic polybutadiene ionomers, sulfonated ethylene-propylene-diene terpolymer ionomers, styrene-acrylic acid copolymer ionomers, sulfonated polystyrene ionomers, sulfonated polypentenamer ionomers, telechelic polyisobutylene sulfonated ionomers, alkyl methacrylate-sulfonate copolymer ionomers, styrene-based polyampholytes ionomers and acid-amine ionomers and the like. Typical examples of ionomers employing salts of carboxylic acid type pendent groups are disclosed in British Patent No. 1,011,981; U.S. Pat. Nos. 3,264,272; 3,322,734; 3,338,734; 3,355,319; 3,522,222; and 3,522,223. Typical examples of ionomers employing phosphonate-type pendent groups include those disclosed in U.S. Pat. Nos. 3,094,144; 2,764,563, 3,097,194; and 3,255,130. Typical examples of ionomers employing sulfonate-type pendent groups include those disclosed in U.S. Pat. Nos. 2,714,605; 3,072,618; and 3,205,285. Other ionomers are disclosed generally in U.S. Pat. Nos. 5,631,328, 5,631,328, 5,554,698, 4,801,649, 5,320,905, 5,973,046, and 4,569,865.

Ionomers comprising copolymers ethylene derived units and acrylic acid (AA), derived units are desirable. As shown in Table 1, examples of commercially available ionomers include, but are not limited to, IOTEK series (ExxonMobil Chemical Company, Houston, Tex.), such as IOTEK 8000, a 45% sodium neutralized ethylene-based ionomer of 15 wt % acrylic acid (prior to neutralization), and IOTEK 7030, a 25% zinc neutralized ethylene-based ionomer of 15 wt % acrylic acid, and SURLYN resins (DuPont Company, Wilmington, Del.).

One or more ionomer layers may contain additives such as antioxidants, pigments or dies, and other agents. In one embodiment, at least one layer of ionomer in the final composite will have a pigment, antioxidant, or other additives. For external uses, it is desirable to add a UV stabilizer such as TINUVEN 791 (CIBA Specialty Chemicals) or UVASIL 2000 HM or LM (Great Lakes Chemicals), both silicon based compositions. Also, for scratch resistance, it is advantageous to add siloxane based compositions such as MB50-001 and/or MB50-321 (Dow Corning Corporation). Effective levels are known in the art and depend on the details of the base polymers, the fabrication mode and the end application. In addition, hydrogenated and/or petroleum hydrocarbon resins and other plasticizers may be used as modifiers.

Other examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts.

Tie-Layer

In one embodiment of the invention, the tie-layer material b (or b and b', etc) is an acid polymer, and can comprise one layer or more of identical or different acid polymers. In another embodiment, the tie-layer material can be a blend of an acid polymer and another polymer such as an α-olefinic polymer or other thermoplastic as described further below ("Substrate").

Acid polymers represent a broad classification of compounds typically formed by the copolymerization of unsaturated carboxylic acid and at least one α-olefin. Desirably, the carboxylic acid may be formed from a carboxylic acid alone or in combination with an ester. More particularly, the acid polymer may be an acid terpolymer represented by the structure (4):

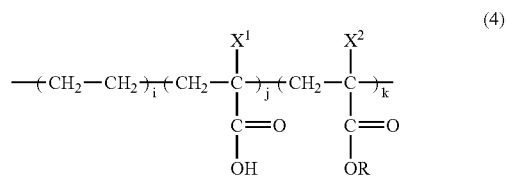

wherein $X_1$ and $X_2$ can be the same or different and are hydrogen or a $C_1$ to $C_6$ alkyl, R can be a $C_1$ to $C_{10}$ normal alkyl or branched alkyl in one embodiment, and a $C_1$ to $C_4$ normal alkyl or branched alkyl in another embodiment, j has a value of from 5 to 15% relative to the acid terpolymer weight, and k has a value of from 5 to 25%, and i has a value of from 65 to 90%. In one embodiment, the acid polymer may be partially neutralized, creating a so called "soft ionomer", or partially neutralized acid polymer. The neutralized carboxylic acid groups can be characterized as above for the ionomer. So called soft ionomers are disclosed in, for example, WO 97/02317.

In one embodiment of the invention, the acid polymers are acid terpolymers, which comprise copolymers of ethylene, a lower alkyl acrylate, particularly methyl acrylate, and an acrylic acid, such as disclosed in U.S. Pat. Nos. 5,397,833, and 5,281,651. Other acid polymers are disclosed in U.S. Pat. Nos. 4,307,211, and 5,089,332.

One embodiment of the acid polymer used in the present invention is an ethylene/methyl acrylate/acrylic acid (E/MA/AA) terpolymer (or "EAAT") comprising an acrylate content of from 4 to 40 wt % based on the weight of the entire polymer, from 5 to 35 wt % in another embodiment. The acrylic acid derived unit content is from 1 to 10 wt % in one embodiment, and from 2 to 8 wt % in another embodiment. The remainder of the terpolymer comprises ethylene derived units.

The E/MA/AA terpolymer may comprise a wide range of melt indexes, generally between 0.1 to 30 dg/min in one embodiment, and from 1 to 10 dg/min in another (ASTM D1238, 190/2.16). Acrylates that are particularly useful in the acid terpolymers are lower alkyl ($C_1$ to $C_4$) acrylate esters.

As shown in Table 1, commercial examples of acid polymers include, but are not limited to, ESCOR AT-310 resin having 6.5 wt % methyl acrylate derived units and 6.5 wt % acrylic acid derived units, and ESCOR AT-320 having 18 wt % methyl acrylate derived units and 6 wt % acrylic acid derived units, both are ethylene acid, terpolymers (ExxonMobil Chemical Company, Houston, Tex.). Soft ionomers are commercially available as IOTEK 7510, a 69% zinc neutralized acid terpolymer of 6 wt % acrylic acid and 20 wt % methacrylic acid (prior to neutralization), and IOTEK 7520, a 43% neutralized acid terpolymer of 6 wt % acrylic acid and 20 wt % methyl acrylate, also available from ExxonMobil Chemical Company.

Acid polymers, or blends of the acid polymer with another polymer, are embodiments of the tie-layer materials as described in FIGS. 1 through 3. In one embodiment, the tie-layer is made from an acid polymer and a high density polyethylene polymer blend. In another embodiment, the tie-layer is a acid polymer and a high density polypropylene blend.

The tie-layer may also include additives such as pigments, dyes, antioxidants, antiozonants, and other agents to improve its performance. Examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts.

Substrate

In one embodiment of the invention, the substrate is a polyolefin. One class of polyolefins useful in this invention are thermoplastic polyolefins. Thermoplastic polyolefins are a desirable substrate material. Thermoplastic Polyolefins (TPOs) are a class of materials including blends of polypropylene and a rubber phase such as EPDM (ethylene-propylene-diene monomer) or EP (ethylene-propylene rubber). The TPO's can be made either by physical blending or in-situ reactor-made. The industry definition of TPO's typically covers blends of greater than 20 wt % rubber phase, whether made by physical blending or reactor-made.

These thermoplastic polyolefins may be homopolymers, copolymers, or a combination thereof. These thermoplastic polyolefins may be blended with the acid polymers described above and/or with modifiers, described in greater detail below. More particularly, these thermoplastic polymers may be linear or branched polymers and include polyethylene polymers, polyethylene copolymers, polypropylene polymers and polypropylene copolymers. Suitable comonomer reactants may include one or a combination of either ethylene, $C_3$-$C_{30}$ α-olefins or diolefins. Examples of diolefins include α,ω-diene and more particularly, α,ω-dienes that contain at least 7 carbon atoms and have up to about 30 carbon atoms. Representative examples of such α,ω-dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like. Additionally, α,ω-dienes containing aliphatic, cyclic or aromatic substituents may also be used. Other useful substrate materials are the class of dynamically vulcanized alloys of nylon and copolymers of isobutylene and p-methylstyrene.

Another suitable substrate material is a so called plastomer, which, in one embodiment is a copolymer and a $C_3$ to $C_{10}$ α-olefin and ethylene having a density in the range of less than 0.915 g/cm$^3$. In another embodiment, the plastomer useful in the invention has a density in the range of from 0.85 to 0.97 g/cm$^3$ and a melt index (MI) between 0.10 and 20 dg/min. Plastomers can also be described as metallocene catalyzed copolymers of ethylene and higher α-olefin comonomers such as propylene, 1-butene, 1-hexene and 1-octene, and which contain enough of one or more of these comonomers to yield a density between 0.85 and 0.915 g/cm$^3$. An example of a commercially available plastomer is EXACT 4150, a copolymer of ethylene and 1-hexene, the 1-hexene derived units making up 18.5 wt % of the plastomer (ExxonMobil Chemical Company, Houston, Tex.).

Desirably, the substrate has a melt flow rate of greater than or equal to 20 dg/min, a high stiffness (1% secant flexural modulus) of 150 kpsi (1000 MPa) or higher, and cold temperature ductility at −30° C. at 5 mph (133 m/min). Some commercially available painted TPO materials only have ductility down to 0° C. at 5 mph (133 m/min), while PP8244 (ExxonMobil Chemical Company) with ionomer film shows ductility to −30° C. at 15 mph (400 m/min). Thus, this embodiment of the present invention would be an improvement over painted TPO substrates of the prior art.

Polyethylene and polypropylene copolymers and homopolymers are desirable substrates. The polyethylene polymers may include low density polyethylene (LDPE), linear low density polyethylene (LLDPE), high density polyethylene (HDPE). These ethylene polymers are well known in the art and include both ethylene homopolymers and copolymers with higher α-olefins. As shown in Table 1, examples of polyethylene polymers include: HD9856B resin, a broad molecular weight bimodal homopolymer; EXCEED 357C32 resin, an ethylene/hexene copolymer; HD-6908, a narrow molecular weight homopolymer; LL-6201, a LLDPE, an ethylene-butene copolymer, and EXACT plastomers, lower density ethylene-butene copolymers, all available from ExxonMobil Chemical Company (Houston, Tex.).

The polypropylene polymers may include polypropylene random copolymers, polypropylene impact copolymers and blends thereof with ethylene plastomers and elastomers. Ethylene plastomers and elastomers may be linear or branched and may be formed from a copolymer of ethylene and one or more $C_3$-$C_{16}$ α-olefins. Such plastomers and elastomers may be blended, for example with a polypropylene polymer. Examples of polypropylene polymers include impact copolymers such as ESCORENE PP7032E2 and PP8102E3 resins and ExxonMobil PP8114 and PP8224 resins, a blend of a plastomer and impact copolymer having 69 wt % polypropylene, 14.1 wt % ethylene-propylene rubber, and 17 wt % ethylene-hexene plastomer, are all available from ExxonMobil Chemical Company (Houston, Tex.).

Finally, the substrate may be any other material such as fiberglass, wood, glass, etched glass, aluminum, steel or other metal substrates.

Lamination Process

The tie-layer and at least one ionomer layer described above may be adhered to one another by any appropriate means to form the laminate. In one embodiment, the ionomer layer is adhered to the acid polymer layer in a co-extrusion process. The co-extrusion process can include a 2, 3, 4 or more co-extruded layers. In general, the process includes first melting each material in an appropriate device and depositing or extruding these molten or semi-molten materials together through a die. The various layers can be combined in the melt stage via appropriate mechanisms known in the art prior to exiting the die, or combined after exiting the die. This is followed by contacting the thus formed multi-layered laminate with a series of chill rolls and sheet conveyer. The cooled laminate is then cut to size or rolled by appropriate means.

The ionomer, acid polymer and other materials that form the laminate of the present invention can be extruded using conventional equipment well known in the industry. In one embodiment, the extrusion process conditions are as follows. The temperature controllers of the extruder(s) used to process the ionomer(s) for the a layer(s) are set at 180° C. to 225° C. in one embodiment (and in the examples below), yielding a final material melt temperature of 200° C. to 215° C. The temperature controllers of the extruder(s) used to process the acid polymer(s) for the b layer(s) are set for 195° C. to 225° C. in another embodiment, yielding a final material melt temperature of 210° C. to 230° C. (and in the examples below). It is desirable that the viscosity of each material to be extruded be closely matched to each other for high gloss and color compatibility.

The final laminate may have any number of layers of ionomer and or tie-layer materials. Embodiments of the laminate include one layer of ionomer and one layer of an acid polymer. Another embodiment includes two layers of ionomer and one layer of an acid polymer. Yet another embodiment of the laminate includes two layers of ionomer and two layers of tie-layer material such as an acid polymer and/or blend of acid polymer and polyolefin. In yet another embodiment of the laminate, there may be two layers on ionomer and one layer an acid polymer/polyolefin blend as the tie-layer.

As an example of one embodiment of the laminate of the invention, two layers of ionomer may be co-extruded with one layer of tie-layer material, wherein the ionomers are $Zn^{2+}$ and $Na^+$ salts of ethylene acrylic acid copolymers and the tie-layer material is ethylene acrylic acid terpolymer (or "EAAT"). Another embodiment includes two ionomer layers of $Zn^{2+}$ and $Na^+$ salts of ethylene acrylic acid copolymers and a tie-layer including a polypropylene/acid terpolymer blend such as, for example, a polypropylene impact copolymer present from 10 to 90 wt % in one embodiment, and from 30 to 70 wt % in another embodiment, and from 40 to 60 wt % in yet another embodiment in the blend, and EAAT present from 10 to 90 wt % in one embodiment, from 30 to 70 wt % in another embodiment, and from 40 to 60 wt % in yet another embodiment in the blend.

In yet another example of the laminate, two ionomer layers as described above may be present with one layer of tie-layer material, the tie-layer including a blend of high density polyethylene (HDPE) and EAAT. The HDPE may be present in the range from 10 to 90 wt % in one embodiment, from 25 to 75 wt % in another embodiment, and from 35 to 65 wt % in yet another embodiment, while the EAAT is present in the range from 10 to 90 wt % in one embodiment, from 25 to 75 wt % in another embodiment, and from 35 to 65 wt % in yet another embodiment.

In yet another example of the laminate, two ionomer layers may be present with one tie-layer material, wherein the tie-layer material is a blend of the following: HDPE and linear low density polyethylene (LLDPE) in a ratio of from 75/25 wt % to 85/15 wt %, blended with EAAT, the EAAT present in the tie-layer blend from 10 to 90 wt % in one embodiment, from 25 to 75 wt % in another embodiment, and from 35 to 65 wt % in yet another embodiment.

In yet another example of the laminate, two ionomer layers may be present with one tie-layer material, wherein the tie-layer material is a blend of the following: linear low density polyethylene blended with EAAT, the EAAT present in the tie-layer blend from 10 to 90 wt % in one embodiment, from 25 to 75 wt % in another embodiment, and from 35 to 65 wt % in vet another embodiment.

In yet another example of the laminate, two layers of ionomer as described above may be co-extruded with two layers of tie-layer material. Examples of this tie-layer configuration include one layer of an ethylene acrylic acid terpolymer and another layer of a blend of polypropylene and acid polymer, specifically, a polypropylene impact copolymer present from 10 to 90 wt % in one embodiment, and from 30 to 70 wt % in another embodiment, and from 40 to 60 wt % in yet another embodiment in the blend, and ethylene acrylic acid terpolymer present from 10 to 90 wt % in one embodiment, from 30 to 70 wt % in another embodiment, and from 40 to 60 wt % in yet another embodiment in the blend.

The final laminate may have any number of layers of ionomer and tie-layer materials. In one embodiment, the laminate is two layers, three in another embodiment, and four layers in yet another embodiment. In one embodiment, the ionomer layer or layers, prior to thermoforming, are from 13 to 1000 µm. In another embodiment, the pre-thermoformed ionomer layer or layers is from 25 to 380 µm. In yet another embodiment, the pre-thermoformed ionomer layer is from 200 to 380 µm. The tie-layer can be of comparable thickness ranges, making the overall thickness of the laminate from 0.1 mm to 5 mm in one embodiment, or from 0.25 to 3 mm in yet another embodiment.

In an embodiment of the laminate, the melt viscosity (MI) of each laminate layer is within 1 and 4 MI (dg/min) of the layer in which it is in direct contact with during co-extrusion, and within 2 and 3 MI (dg/min) in another embodiment. Composites with the desired appearance and adhesion can be produced with compounds in the range of 2 and 5 MI (dg/min).

Thermoforming Process

Thermoforming is a process of forming at least one pliable plastic sheet into a desired shape. In an embodiment of the present invention, the laminate that is formed from the at least one ionomer layer and tie-layer are thermoformed into a desirable shape, typically the shape of the end use article. An embodiment of the thermoforming sequence is described. First, the co-extruded laminate of ionomer and acid polymer (or other tie-layer materials) is placed on a shuttle rack to hold it during heating. The shuttle rack indexes into the oven which pre-heats the film before forming. Once the film is heated, the shuttle rack indexes back to the thermal forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperature of 170° C. to 185° C. A pre-stretched bubble step is used, especially on large parts, to improve material distribution. Plug-assisted forming is generally used for small deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The formed part is cooled in the mold. Sufficient cooling to maintain a mold temperature of 30° C. to 65° C. is needed. The part is below 90° C. to 100° C. before ejection in a desirable embodiment. For the best behavior in thermoforming, the lowest melt flow rate polymers are desirable.

Composite Formation

In one embodiment, after thermoforming, the composite of the laminate and substrate is formed by an injection molding process or spray process, or other suitable process. In a desirable embodiment, injection molding is used.

One embodiment of the injection molding process is described as follows. The shaped laminate is placed into the injection molding tool. The mold is closed and the substrate material is injected into the mold. The substrate material has a melt temperature between 215 and 250° C. in one embodiment, and is injected into the mold at an injection speed of between 2 and 10 seconds to obtain the desired adhesion to the laminate in another embodiment. After injection, the material is packed or held at a predetermined time and pressure to make the part dimensionally and aesthetically correct. Typical time periods are from 5 to 25 seconds and pressures from 200 to 1500 psi. The mold is cooled between 10 and 70° C. to cool the substrate. The temperature will depend on the desired gloss and appearance needed. Typical cooling time is from 10 to 30 seconds, depending on part on the thickness. Finally, the mold is opened and the shaped composite article ejected.

Suitable substrates for injection molding include various grades of polyethylene (PE) and polypropylene (PP) as shown in Tables 1-4. In a desirable embodiment, high density polyethylene is injection molded into the thermoformed laminates described above. In particular, high density polyethylene may be injection molded into a formed laminate, the laminate being two layers of ionomer material and one tie-layer-containing a blend of a EAAT with a LLDPE and or LDPE.

An embodiment of the invention is a laminate suitable for an impact and scratch resistant article comprising at least one layer of ionomer, and a tie-layer, wherein the at least one ionomer layer and tie-layer are secured to one another by any suitable means to form a shaped laminate. At least one ionomer layer may pigmented, desirably a second ionomer layer a' (FIG. 3). The tie-layer may comprise any one or blend of an acid polymer, soft ionomer, or polyolefin. The polyolefin, which may also be suitable as a substrate material, is selected from polyethylene polymers, polyethylene copolymers, polypropylene polymers, polypropylene copolymers, polypropylene impact copolymer and a blend of polypropylene impact copolymer and ethylene plastomer, and mixtures thereof. Typically, the polyolefin has a 1% secant flexural modulus of from greater than 1000 MPa.

The laminate may have certain desirable characteristics in flsrther embodiments. For example, the melt indexes of adjacent laminate layers are within less than 1 to 4 dg/min of one another. Further, the at least one ionomer layer may have a 1% secant flexural modulus of between 150 and 400 MPa in another embodiment. The tie-layer comprises a blend of an acid terpolymer and a polyolefin, the polyolefin present in the blend from 30 wt % to 70 wt % of the blend, and may be blend of ethylene acrylic acid terpolymer and a polypropylene, or alternately, a blend of ethylene acrylic acid terpolymer, linear low density polyethylene, and high density polyethylene.

The laminate may be formed by any suitable technique, such as by co-extrusion in one embodiment. Further, the laminate may be shaped by any suitable technique such as by thermoforming the laminate. Various articles may be formed from the laminate such as automotive parts and sporting equipment.

In another embodiment, the invention is a composite article suitable for an impact and scratch resistant article comprising a laminate comprising at least one layer of ionomer and a tie-layer, wherein the at least one ionomer layer and tie-layer are secured one another to form a laminate, and a substrate secured to the laminate to form the composite article. The tie-layer may comprises an acid polymer, soft ionomer, polyolefin, and blends thereof. The substrate may have certain desirable properties, such as a 1% secant flexural modulus of greater than 1000 MPa in one embodiment. The polyolefin suitable for the substrate and/or the tie-layer is selected from polyethylene polymers, polyethylene copolymers, polypropylene polymers, polypropylene copolymers, polypropylene impact copolymer and a blend of polypropylene impact copolymer and ethylene plastomer, and mixtures thereof.

The laminate in this embodiment may have certain desirable features. For example, the melt indexes of adjacent laminate layers are within less than 1 to 4 dg/min of one another. Further, the tie-layer comprises a blend of an acid terpolymer and a polyolefin, the polyolefin present in the blend from 30 wt % to 70 wt % of the blend. The tie-layer may also comprise a blend of ethylene acrylic acid terpolymer and a polyethylene. Further, the tie-layer may comprise a blend of etheylene ethylene acrylic acid terpolyrner, linear low density polyethylene, and high density polyethylene.

The laminate may be formed by any suitable technique, such as by co-extrusion in one embodiment. Further, the laminate may be shaped by any suitable technique such as by thermoforming the laminate. The substrate may be contacted with the laminate by any suitable technique, injection molding in one embodiment. Various articles may be formed from the laminate such as automotive parts and sporting equipment.

In a further embodiment of the invention is a composite suitable for impact and scratch resistant articles formed by the method comprising first forming a laminate comprising at least two layers of material; wherein the melt indexes (MI) of adjacent laminate layers are within 1 to 4 dg/min of one another; followed by forming the laminate into a shape, the laminate having at least one layer of ionomer and a tie-layer, wherein the at least one ionomer layer and tie-layer contact one another to form the laminate; and finally, securing a substrate layer to the laminate to form the composite article. The formation of the laminate may be performed by any suitable technique, such as, for example, co-extrusion. The shaping step of the laminate may also be performed by any suitable technique such as, for example, by thermoforming. Further, the substrate may be secured to the laminate by any suitable technique such as by injection molding.

End Use Articles

The laminate of the present invention can be used as a thermoformable sheet where the substrate is either sprayed or injection molded to couple it with the ionomer/tie-layer laminate sheet. The composite if formed into the desired shape to form the article, or composite article. Various types of substrate materials to form highly desirable articles. The laminate can be used with plastic substrates such as homopolymers, copolymers, foams, impact copolymers, random copolymers, and other applications. Specifically, some articles in which the present invention can be incorporated are the following: vehicle parts, especially exterior parts such as bumpers and grills, rocker panels, fenders, doors, hoods, trim, and other parts can be made from the laminates, composites and methods of the invention.

Other articles can also be named, for example: counter tops, laminated surface counter tops, pool liners/covers/boat covers, boat sails, cable jacketing, motorcycles/snowmobiles/outdoor vehicles, marine boat hulls/canoe interior and exterior, luggage, clothing/fabric (combined with non-wovens), tent material, GORETEX, Gamma-radiation resistant applications, electronics housing (TV's, VCR's and computers), a wood replacement for decks and other outdoor building materials, prefab buildings, synthetic marble panels for construction, wall covering, hopper cars, floor coating, polymer/wood composites, vinyl tile, bath/shower/toilet applications and translucent glass replacement, sidings, lawn/outdoor furniture, appliances such as refrigerators, washing machines, etc., children's toys, reflective signage and other reflective articles on roads and clothing, sporting equipment such as snowboards, surfboards, skis, scooters, wheels on in-line skates, CD's for scratch resistance, stadium seats, aerospace reentry shields, plastic paper goods, sports helmets, plastic microwaveable cookware, and other applications for coating plastics and metal where a highly glossy and scratch resistant surface is desirable, while not being subject to algae/discoloration.

Test Methods

Melt Flow Rate (MFR) or Melt Index (MI). Melt flow rate is measured according to ASTM D1238 test method, at 230° C. and 2.16 kg load, and is expressed as dg/min or g/10 min. The melt index is measured according to ASTM D1238 test method, at 190° C. and 2.16 kg load, and is expressed as dg/min or g/10 min.

Peak Melting Temperature. The peak melting temperature (Tm, second melt) of the polymer was measured by using DuPont Instruments 912 differential scanning calorimeter (DSC) which is equipped with the standard numerical analysis software. The area under the melting peak represents the enthalpy of melt and is reported in Joules per gram (J/g). Standard procedure involved equilibrating the sample at 0° C., increasing the temperature at a rate of 10° C./min, to 200° C. (first melt).

Flexural Modulus. The flexural modulus is obtained according to ASTM D790, with a crosshead speed of 1.27 mm/min, and a support span of 50.8 mm, using an Instron machine.

90° Adhesion Test. This was done per ExxonMobil Chemical Company method. First, a cut is made through the laminate to the substrate in an "X" pattern. Second, the substrate plaque is folded on the previously scored "X" pattern, the fold being toward the substrate. Third, insert a razor under the laminate (if possible) and lift up the razor. Finally, if a corner of the laminate is lifted, pull at an angle of 90°. The results of these tests are shown in Tables 2-4 as "Good", which means that there was no loss or only a very small amount of loss of adhesion between the substrate and laminate or between laminate layers, and "Poor", which means that there was loss or substantial loss of adhesion between either the substrate and laminate or between laminate layers. A rating of "Fair" means that there was some intermediate level of adhesion loss.

Instrumented Impact. The instrumented impact strength is measured by ASTM D3763 using a Dynatup Model 8250. A drop weight of 25 pounds (111 N) and a speed of 15 miles per hour (133 to 400 meters/min) are used to measure the failure mode and the total energy. The drop weight is adjusted such that the velocity slowdown is less than 20%.

Failure Mode. The failure mode is defined as ductile (D) if the load vs. displacement curve is symmetric and there are no radial cracks in the sample and the tup pierces through the sample. The ductile-brittle (DB) failure mode is defined as the mode where on the load-displacement curve, the load goes through the maximum, and rapidly decreases to zero and there are radial cracks in the sample. And, brittle-ductile (BD) failure mode is defined as the condition where in the load vs. displacement curve, the load rapidly decreases and the sample breaks into multiple pieces. The desirable failure mode is completely ductile at the specified temperatures.

EXAMPLES

All examples 1-20 were co-extruded sheets made on either a 3 or 4 layer co-extrusion machine. All 3 layer examples were produced on a Battenfeld Glouster co-extruder machine. All 4 layer examples were produced at MAYCO Plastics on a HPM co-extruder machine. Each example comprises the formulation as described in the Tables, wherein each formulation may be tested for different properties.

The materials used to make all third and fourth layers were pre-compounded at ExxonMobil Chemical Baytown Polymers Center in Baytown, Tex. Pre-compounding was necessary due to the above mentioned extrusion equipment not having the proper screw design to adequately mix the polypropylene and polyethylene/acid terpolymer blends while processing sheet. The tie-layer materials should be adequately mixed to provide the necessary bond between the laminate and substrate.

Americhem Corp in Cuyahoga Fall, Ohio, and A. Schulman Corp. in Birmingham, Mich., provided color pigmentation for the trials. Colors used for the trials were DCX (DaimlerChrysler) approved automotive colors white, black, red, and silver metallic. Pigmentation was provided in a concentrated pellet form with a blend ratio of 25:1

General processing parameter details for each co-extruded laminate examples are provided in the previously mentioned process sections on co-extrusion, thermal forming, and injection molding.

During the co-extrusion trials, the various tie-layers and ionomers were evaluated and noted as to the ease of processability to produce a 3 or 4 layer laminate that had the desired gloss level and color. Compatibility of the various layers' (ionomers', tie-layers') viscosities to one another in the co-extrusion process improves the final appearance of the sheet. Large viscosity differences between layers produced laminates with poor gloss level, uneven surfaces, poor color depth and dispersion, large variation in sheet thickness, and areas where layers were even missing. Changes to the third and forth layers were made based on the compatibility to the ionomer layers. The melt viscosities (MI) of each layer were within 2 to 3 MI units (dg/min) of each other. Composites with the desired appearance and adhesion were in the range of 2 and 5 MI units (dg/min), such as Examples 1-4.

Adhesion between layers was checked during and after 24 hrs for each composition using the ExxonMobil modified 90° Adhesion Test (described above). Layer composition (thickness) was adjusted accordingly if adequate adhesion was not present during the trials (not enough tie-layer material). Adhesion testing after 24 hrs, was done to make sure that there was adequate adhesion to withstand the stresses induced during the natural, shrinkage that occurs during the early aging of the composite. It has been shown through testing that good adhesion may be present initially, but significant adhesion loss can occur during aging (or annealing) of the composite even for a relatively short period of time such as 24 hrs.

Impact testing of the sheet was done on 4" (102 mm) diameter impact disk molded with ExxonMobil PP8224 as a substrate material. Examples of the laminate were placed in the injection molding disk tool, substrate material was injection molded behind the sheet, cooled, and ejected from the mold. The disks were then tested on a Dynatup instrumented impact tester at −30° C. at 15 mph (400 m/min).

The results of Examples 1-5 in Table 2 show that blends of an acid terpolymer and impact copolymer work best as the portion of the tie-layer (layer 4 in these Examples) that is secured to polyethylene or polypropylene substrates. Further, these Examples shown that having a two layer tie-layer works well with a polypropylene substrate, as in Examples 2 throuoh 4. Adhesion performance using the acid terpolymer alone as a tie-layer with polypropylene as the substrate was not as good as when polyethylene was the substrate.

The results of Examples 6 through 12 in Table 3 show again that a two layer tie-layer having a blend of the acid terpolymer and a polypropylene work well. Further, these data shown that, as in Example 6, that having a tie-layer material of polypropylene (PP 8102E3) that contacts the polypropylene substrate works well under the Adhesion Test. And, when there is one layer in the tie-layer such as in Examples 8-12, while there is good adhesion between the tie-layer and substrate, there is poor adhesion between the ionomer and tie-layer.

The results of Examples 13 through 20 in Table 4 show that a one layer tie-layer comprising a blend of materials creates good adhesion to a polyethylene substrate and the ionomer layers. In particular, Examples 14-19 all have tie-layers that are blends of polypropylene or polyethylenes and an acid terpolymer. Also, Example 20 shows that the acid terpolymer alone works well with the polyethylene substrate, which is consistent with the results of Example 1 using a different grade of acid terpolymer.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

Terms that are or may be trademarked in some jurisdictions are used in the description. These terms are written in all capital letters, and is understood to recognize such trademarks. For brevity, markings such as "™" or "®" have not been used, and in the tables, the terms ESCOR, ESCORENE etc, are not used in all.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Description and properties of commercially available materials

| Material | Description | Peak Melt temp. (° C.) | Melt Index or Melt Flow Rate (dg/min) | 1% Secant Flex. Modulus (MPa) [ASTM D-790] |
|---|---|---|---|---|
| IOTEK 7030 (ExxonMobil) | Zn salt of ethylene acrylic acid copolymer | 85 | 2.5 (MI) | 155 |
| IOTEK 7510 (ExxonMobil) | Zn salt of ethylene acrylic acid copolymer | 67 | 1.2 (MI) | 35 |
| IOTEK 7520 (ExxonMobil) | Zn salt of ethylene acrylic acid copolymer | 67 | 2.0 (MI) | 30 |
| IOTEK 8000 (ExxonMobil) | Na salt of ethylene acrylic acid copolymer | 83 | 0.8 (MI) | 320 |
| ESCORENE PP 8102E3 (ExxonMobil) | Polypropylene impact copolymer | 162 | 2.0 (MFR) | 22930 |
| ESCOR AT 320 (ExxonMobil) | Ethylene acrylic acid terpolymer (EAAT) | 76 | 5.0 (MI) | 19 |
| ESCOR AT 310 (ExxonMobil) | Ethylene acrylic acid terpolymer (EAAT) | 76 | 6.0 (MI) | 60 |
| ESCORENE HD 9856B (ExxonMobil) | High Density polyethylene (HDPE) | 135 | 0.43 (MI) | 1450 |
| EXCEED 357C32 (ExxonMobil) | metallocene catalyzed Linear Low Density Polyethylene (mLLDPE) | 115 | 3.5 (MI) | — |
| ESCORENE LL6201 (ExxonMobil) | Linear Low Density Polyethylene | 123 | 50 (MI) | 214 |
| ESCORENE HD 6908 (ExxonMobil) | High Density Polyethylene (HDPE) | 136 | 8.2 (MI) | 827 |
| PP 8224 (ExxonMobil) | Polypropylene impact copolymer | 162 | 25 (MFR) | 1034 |
| ExxonMobil PP7032E2 | Polypropylene impact copolymer | 162 | 4 (MFR) | 980 |

TABLE 2

Multilayer co-extruded film formulations for polyethylene and polypropylene substrate composites

| Example Number | Layer 1 | Layer 2 | Layer 3 (wt %/wt %) | Layer 4 (wt %/wt %) | Instrumented Impact @ 30° C. & 15 mph (400 m/min) | 90° Adhesion Test[1] PE[2] | 90° Adhesion Test[1] PP[3] |
|---|---|---|---|---|---|---|---|
| 1 | IOTEK 8000 | IOTEK 7030 | AT320 | — | — | Good | Poor |
| 2 | IOTEK 8000 | IOTEK 7030 | AT320 | PP 8102E3/AT320 (50/50) | 5 ductile | — | Good |
| 3 | IOTEK 8000 | IOTEK 7030 | AT320 | PP 8102E3/AT320 (60/40) | 5 ductile | — | Good[4] |
| 4 | IOTEK 8000 | IOTEK 7030 | PP 8102E3/AT320 (50/50) | PP 8102E3/AT320 (60/40) | 5 ductile | — | Good |
| 5 | IOTEK 8000 | IOTEK 7030 | PP 8102E3/AT320 (60/40) | PP 8102E3/AT320 (50/50) | 5 ductile | — | Fair[5] |

[1]The test is as described in the text. "Good" means that there was no loss of adhesion between the substrate and laminate or between laminate layers. "Poor" means that there was loss of adhesion between either the substrate and laminate or between laminate layers.
[2]Polyethylene is the substrate.
[3]Polypropylene, PP 8224, is the substrate.
[4]Some separation between the 2nd and 3rd layers.
[5]Some separation between the 3rd and 4th layers.

TABLE 3

Multilayer co-extruded film formulations for polypropylene substrate composites

| Example Number | Layer 1 | Layer 2 | Layer 3[1] (wt %/wt %) | Layer 4 (wt %/wt %) | 90° Adhesion Test to PP[2] |
|---|---|---|---|---|---|
| 6 | IOTEK 8000 | IOTEK 7030 | PP 8102E3/AT320 (50/50) | PP 8102E3 | Good adhesion to PP substrate |
| 7 | IOTEK 8000 | IOTEK 7030 | PP 8102E3/AT320 (40/60) | PP 8102E3/AT320 (50/50) | Good adhesion to PP substrate |
| 8 | IOTEK 8000 | IOTEK 7030 | PP 8102E3/AT320 (67/33) | — | Poor adhesion to ionomer, Good adhesion to PP substrate |
| 9 | IOTEK 8000 | IOTEK 7030 | PP 8102E3/AT320 (65/35) | — | Poor adhesion to ionomer, Good adhesion to PP substrate |
| 10 | IOTEK 8000 | IOTEK 7030 | PP 8102E3/AT320 (60/40) | — | Poor adhesion to ionomer, Good adhesion to PP substrate |
| 11 | IOTEK 8000 | IOTEK 7030 | PP 8102E3/MD353D (90/10) | — | Poor adhesion to ionomer - Delamination, Good adhesion to PP substrate |
| 12 | IOTEK 8000 | IOTEK 7030 | PP 8102E3/MZ203D (90/10) | — | Poor adhesion to ionomer - Delamination, Good adhesion to PP substrate |

[1]MD 353D and MZ203D are Fusabond Products from Du Pont; PP 8102E3 is ExxonMobil's PP 8102E3 AT320 is ExxonMobil's ESCOR AT320 as in Table 1.
[2]The test is as described in the text. "Good" means that there was no loss of adhesion between the substrate and laminate or between laminate layers. "Poor" means that there was loss of adhesion between either the substrate and laminate or between laminate layers.

TABLE 4

Multilayer co-extruded film formulations for polyethylene composites

| Example Number | Layer 1 | Layer 2 | Layer 3[1] (wt %/wt %) | 90° Adhesion Test to PE[2] |
|---|---|---|---|---|
| 13 | IOTEK 8000 | IOTEK 7030 | A1B1 (75/25) | Poor adhesion to substrate |
| 14 | IOTEK 8000 | IOTEK 7030 | A1B1 + | Good adhesion to ionomer and HDPE 6908 substrate |
| 15 | IOTEK 8000 | IOTEK 7030 | A2B1 − | Good adhesion to ionomer and HDPE 6908 substrate |

TABLE 4-continued

Multilayer co-extruded film formulations for polyethylene composites

| Example Number | Layer 1 | Layer 2 | Layer 3[1] (wt %/wt %) | 90° Adhesion Test to PE[2] |
|---|---|---|---|---|
| 16 | IOTEK 8000 | IOTEK 7030 | A2B1 + | Good adhesion to ionomer and HDPE 6908 substrate |
| 17 | IOTEK 8000 | IOTEK 7030 | A1B2 − | Good adhesion to ionomer and HDPE 6908 substrate |
| 18 | IOTEK 8000 | IOTEK 7030 | A1B2 + | Good adhesion to ionomer and HDPE 6908 substrate |
| 19 | IOTEK 8000 | IOTEK 7030 | A2B2 + | Good adhesion to ionomer and HDPE 6908 substrate |
| 20 | IOTEK 8000 | IOTEK 7030 | B2 | Good adhesion to ionomer and HDPE 6908 substrate |

[1]A1: ESCORENE HD9856/ESCORENE LL 6201 (85/15 wt %); A2: EXCEED 357C32; B1: ESCOR AT320; B2: ESCOR AT310. The meaning of the "+" and "−" symbols are as follows: (+) is 65 wt % ESCOR 320 or 310; (−) is 35 wt % ESCOR AT320 or 310.
[2]The test is as described in the text. "Good" means that there was no loss of adhesion between the substrate and laminate or between laminate layers. "Poor" means that there was loss of adhesion between either the substrate and laminate or between laminate layers.

We claim:

1. A laminate suitable for applying to a polyolefin substrate comprising:
   (a) at least one layer of ionomer; and
   (b) a tie-layer, comprising a blend of an acid copolymer and a polyolefin, wherein the at least one ionomer layer and tie-layer are secured to one another to form a laminate and the melt indexes of adjacent laminate layers are within less than 1 to 4 dg/min of one another.

2. The laminate of claim 1, wherein at least one ionomer layer is pigmented.

3. The laminate of claim 1, wherein the tie-layer acid copolymer comprises an ethylene (meth)acrylic acid terpolymer.

4. The laminate of claim 1, wherein the tie layer blend comprises an ethylene (meth)acrylic acid terpolymer and ethylene polymer.

5. The laminate of claim 1, wherein the polyolefin has a 1% secant flexural modulus of from greater than 1000 MPa.

6. The laminate of claim 1, wherein the at least one ionomer layer has a 1% secant flexural modulus of between 150 and 400 MPa.

7. The laminate of claim 1, wherein the tie-layer comprises from 30 wt % to 70 wt % ethylene polymer.

8. The laminate of claim 1, wherein the tie-layer comprises a blend of acid copolymer and propylene polymer.

9. The laminate of claim 1, wherein the tie-layer comprises propylene impact copolymer.

10. The laminate of claim 1, wherein the laminate is co-extruded.

11. The laminate of claim 1, wherein the laminate is shaped.

12. The laminate of claim 11, wherein the laminate is shaped by thermoforming the laminate.

13. An automotive component made from the laminate of claim 12.

14. A composite article suitable for an impact and scratch resistant article comprising:
   (a) a laminate comprising a least one layer of ionomer and a tie-layer, comprising a blend of an acid copolymer and an ethylene polymer, wherein the at least one ionomer layer and tie-layer are secured to one another to form a laminate and the melt indexes of adjacent laminate layers are within less than 1 to 4 dg/min of one another; and
   (b) a substrate secured to the laminate to form the composite article wherein the substrate comprises ethylene polymer.

15. The composite of claim 14, wherein the substrate has a 1% secant flexural modulus of greater than 1000 MPa.

16. The composite of claim 14, wherein the acid polymer is an ethylene (meth)acrylic acid terpolymer.

17. The composite of claim 14, wherein the tie-layer comprises from 30 wt % to 70 wt % ethylene polymer and from 70 wt % to 30 wt % acid copolymer.

18. The composite of claim 14, wherein the ionomer comprises an ethylene (meth)acrylic acid copolymer.

19. The composite of claim 14, wherein the ionomer comprises a blend of Na and Zn salts of acid copolymers.

20. The composite of claim 14, wherein the laminate is co-extruded.

21. The composite of claim 14, wherein the laminate is shaped.

22. The composite of claim 21, wherein the laminate is shaped by thermoforming the laminate.

23. An automotive component made from the composite of claim 22.

24. A composite comprising:
   (a) a laminate comprising at least one layer of ionomer and a tie-layer, wherein the at least one ionomer layer and tie-layer are secured to one another to form a laminate; and wherein the tie-layer comprises a blend of propylene polymer and an acid polymer and the melt indexes of adjacent laminate layers are within less than 1 to 4 dg/min of one another; and
   (b) a substrate comprising polypropylene secured to the tie-layer of the laminate to form the shaped composite.

25. The composite of claim 24, wherein at least one ionomer layer is pigmented.

26. The composite of claim 24, wherein the melt indexes of adjacent laminate layers are within less than 2 to 3 dg/min of one another.

27. The composite of claim 24, wherein the propylene polymer is present in the amount of 30 wt % to 70 wt % and the acid polymer is present in the amount of 70 wt % to 30%.

28. The composite of claim 24, comprising at least two tie-layers each comprising a blend of propylene polymer and an acid polymer.

29. The composite of claim 24, wherein the propylene polymer is an impact copolymer.

30. The composite of claim 24, wherein the ionomer comprises an ethylene (meth)acrylic acid copolymer.

31. The composite of claim 24, wherein the ionomer comprises a blend of Na and Zn salts of acid copolymers.

32. The composite of claim 24, wherein the substrate has a 1% secant flexural modulus of greater than 1000 MPa.

33. The composite of claim 24, wherein the laminate is co-extruded.

34. The composite of claim 24, wherein the laminate is shaped.

35. The composite of claim 34, wherein the laminate is shaped by thermoforming the laminate.

36. An automotive component made from the composite of claim 35.

37. A method of forming a shaped laminate comprising:
contacting at least one layer of ionomer and a tie-layer, wherein the tie-layer comprises a blend of an acid polymer and a polymer selected from the group consisting of propylene polymer and ethylene polymer, and the melt indexes of adjacent laminate layers are within less than 1 to 4 dg/min of one another;
securing the at least one layer of ionomer to the tie-layer to form a laminate; and
shaping the laminate.

38. The method of claim 37, wherein the at least one ionomer layer is two ionomer layers.

39. The method of claim 37, wherein at least one ionomer layer is pigmented.

40. The method of claim 37, wherein the propylene polymer is present in the amount of 30 wt % to 70 wt % and the acid polymer is present in the amount of 70 wt % to 30%.

41. The method of claim 37, wherein the shaping step is performed by thermoforming the laminate.

42. The method of claim 41, wherein the laminate is thermoformed into the shape of a desired end use article.

43. The method of claim 37, wherein the acid polymer comprises an ethylene (meth)acrylic acid terpolymer.

44. The method of claim 37, wherein the tie-layer comprises a blend of ethylene (meth)acrylic acid terpolymer, linear low density polyethylene, and high density polyethylene.

45. The method of claim 37, wherein the laminate is co-extruded.

46. An automotive component made from the method of claim 37.

47. A method of forming a composite article comprising:
(a) contacting at least one layer of ionomer and a tie-layer, wherein the tie-layer comprises a blend of an acid polymer and a polymer selected front the group consisting of propylene polymer and ethylene polymer, and the melt indexes of adjacent laminate layers are within less than 1 to 4 dg/min of one another;
(c) securing the at least one layer of ionomer to the tie-layer to form a laminate; and
(d) securing a substrate layer comprising polyolefin to the tie-layer of the laminate to form the composite article.

48. The method of claim 47, wherein the at least one layer of ionomer is two ionomer layers.

49. The laminate of claim 47, wherein at least one ionomer layer is pigmented.

50. The method of claim 47, wherein the acid polymer is an ethylene (meth)acrylic acid terpolymer.

51. The method of claim 47, wherein the securing step (d) is further defined by injection molding the substrate to the tie-layer.

52. The method of claim 47, wherein the securing step (d) is further defined by spraying the substrate on the tie-layer.

53. The method of claim 47, wherein the substrate polyolefin is selected from the group consisting of ethylene polymers, ethylene copolymers, propylene polymers, propylene copolymers, propylene impact copolymer and a blend of propylene impact copolymer and ethylene plastomer, and mixtures thereof.

54. The method of claim 47, wherein the tie-layer comprises a blend of ethylene (meth)acrylic acid terpolymer and a polyethylene.

55. The method of claim 47, wherein the tie-layer comprises a blend of ethylene (meth)acrylic acid terpolymer, linear low density polyethylene, and high density polyethylene.

56. The method of claim 47, wherein the substrate has a 1% secant flexural modulus of greater than 1000 MPa.

57. The method of claim 47, wherein the melt indexes of adjacent laminate layers are within less than 2 to 3 dg/min of one another.

58. The method of claim 47, wherein the laminate is co-extruded.

59. The method of claim 47, further comprising:
(e) shaping the laminate after step (c) and before step (d).

60. The method of claim 59, wherein the composite article is shaped by thermoforming.

61. An automotive component made from the method of claim 59.

62. A composite suitable for impact and scratch resistant articles formed by the method comprising:
(a) forming a laminate comprising at least two layers of material; wherein the melt index (MI) of the layers are within 1 to 4 dg/min of one another;
(b) forming the laminate into a shape, the laminate having at least one layer of ionomer and a tie-layer, wherein the at least one ionomer layer and tie-layer contact one another to form the laminate and the tie-layer comprises a blend of an acid copolymer and a polyolefin polymer; and
(c) securing a substrate layer comprising polyolefin polymer to the laminate to form the composite article.

63. The composite of claim 62, wherein the laminate further has a second ionomer layer, wherein the second ionomer layer is co-extruded with at least the first ionomer layer.

64. The composite of claim 62, wherein the tie-layer acid copolymer is an ethylene (meth)acrylic acid terpolymer and the polyolefin present in the blend from 30 wt % to 70 wt % of the blend.

65. The composite of claim 62, wherein the tie-layer comprises an (meth)acrylic acid terpolymer and the tie-layer polyolefin polymer is selected from the group consisting of propylene polymer and ethylene polymer.

66. The composite of claim 62, wherein at least one ionomer layer is pigmented.

67. The composite of claim 62, wherein the securing step is further defined by injection molding the substrate to the tie-layer.

68. The composite of claim 62, wherein the securing step is further defined by spraying the substrate on the tie-layer.

69. The composite of claim 62, wherein the substrate polyolefin polymer is selected from the group consisting of ethylene polymers, ethylene copolymers, propylene polymers, propylene copolymers, propylene impact copolymer and a blend of propylene impact copolymer and ethylene plastomer, and mixtures thereof.

70. The composite of claim 62, wherein the substrate has a 1% secant flexural modulus of greater than 1000 MPa.

71. The composite of claim 62, wherein the melt indexes of adjacent laminate layers are within less than 2 to 3 dg/min of one another.

72. The composite of claim 62, wherein the laminate is co-extruded.

73. The composite of claim 62, wherein the laminate is shaped by thermoforming the laminate.

74. An automotive component made from the composite of claim 62.

75. A method of forming a composite article comprising:
 (a) contacting at least one layer of ionomer and a tie-layer, wherein the comprises a blend of an acid copolymer and a polymer selected from the group consisting of propylene polymer and ethylene polymer, and the melt indexes of adjacent laminate layers are within less than about 4 dg/min of one another;
 (c) securing the at least one layer of ionomer to the tie-layer to form a laminate; and
 (d) securing a substrate layer comprising polyolefin to the tie-layer of the laminate to form the composite article, the substrate layer selected from the group consisting of propylene polymers and ethylene polymers.

76. A composite comprising:
 (a) a laminate comprising at least one layer of ionomer and a tie-layer, wherein the at least one ionomer layer and tie-layer are secured to one another to form a laminate; and wherein the tie-layer comprises a blend of polymer and an acid polymer, the tie-layer polymer selected from the group consisting of propylene polymers and ethylene polymers and the melt indexes of adjacent laminate layers are within less than about 4 dg/min of one another; and
 (b) a substrate comprising polypropylene secured to the tie-layer of the laminate to form the composite, the substrate selected from the group consisting of propylene polymers and ethylene polymers.

* * * * *